US012681124B2

(12) United States Patent
Priyanto et al.

(10) Patent No.: US 12,681,124 B2
(45) Date of Patent: Jul. 14, 2026

(54) METHOD FOR ASSISTING A FIRST NETWORK NODE IN DETERMINING A PROPERTY OF A NETWORK NODE, A RELATED FIRST NETWORK NODE AND A RELATED WIRELESS DEVICE

(71) Applicant: Sony Group Corporation, Tokyo (JP)

(72) Inventors: Basuki Priyanto, Lund (SE); Yujie Zhang, Lund (SE); Jose Flordelis, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 349 days.

(21) Appl. No.: 18/282,527

(22) PCT Filed: Mar. 11, 2022

(86) PCT No.: PCT/EP2022/056330
§ 371 (c)(1),
(2) Date: Sep. 16, 2023

(87) PCT Pub. No.: WO2022/207276
PCT Pub. Date: Oct. 6, 2022

(65) Prior Publication Data
US 2024/0159853 A1 May 16, 2024

(30) Foreign Application Priority Data
Mar. 31, 2021 (SE) .................................... 2150400-6

(51) Int. Cl.
*G01S 5/00* (2006.01)
*G01S 5/02* (2010.01)
*H04W 56/00* (2009.01)
(52) U.S. Cl.
CPC ............ *G01S 5/0036* (2013.01); *G01S 5/021* (2013.01); *H04W 56/001* (2013.01)

(58) Field of Classification Search
CPC ..... G01S 5/0036; G01S 5/021; H04W 56/001
See application file for complete search history.

(56) References Cited

U.S. PATENT DOCUMENTS 12,238,026 B2 * 2/2025 Chen ...................... H04L 5/0051
2019/0053193 A1 * 2/2019 Park .................... H04W 74/004
(Continued)

FOREIGN PATENT DOCUMENTS

| CN | 105850189 A | * | 8/2016 | ............ H04W 88/08 |
| WO | 2020026211 A1 | | 2/2020 | |
| WO | 2020164710 A1 | | 8/2020 | |

OTHER PUBLICATIONS

International Search Report and Written Opinion from corresponding International Application No. PCT/EP2022/056330, mailed on Jul. 7, 2022, 14 pages.
(Continued)

*Primary Examiner* — Khai M Nguyen
(74) *Attorney, Agent, or Firm* — Tucker Ellis LLP

(57) ABSTRACT

A method is disclosed, performed by a first wireless device (WD) for assisting a first network node in determining a network node property. The method comprises determining whether the first WD satisfies one or more conditions for providing reference information. The method comprises, upon determining that the first WD satisfies the condition for providing the reference information, transmitting, to the first network node, an indication indicative of the first WD being capable of providing the reference information. The method comprises receiving, from the first network node, a request to provide the reference information. The method comprises providing, to the first network node, reference information for assisting the first network node in determining a network node property.

19 Claims, 10 Drawing Sheets

(56) References Cited

U.S. PATENT DOCUMENTS

| | | | | |
|---|---|---|---|---|
| 2019/0349784 A1* | 11/2019 | Tang | .................... | H04B 7/0695 |
| 2021/0099965 A1* | 4/2021 | Manolakos | ........... | G01S 13/878 |
| 2024/0172306 A1* | 5/2024 | Wallentin | .......... | H04W 28/0278 |

OTHER PUBLICATIONS

Office Action and Swedish Search Report from corresponding Swedish Application No. 2150400-6, mailed on Oct. 26, 2021, 10 pages.

3rd Generation Partnership Project, "Technical Specification Group Radio Access Network; NG Radio Access Network (NG-RAN); Stage 2 functional specification of User Equipment (UE) positioning in NG-RAN (Release 16)," 3GPP TS 88.305 V16.4.0, Mar. 2021, 119 pages.

Catt et al., "New WID on NR Positioning Enhancements," 3GPP TSG RAN Meeting #90e, RP-202900, Dec. 7-11, 2020, 5 pages.

Intel Corporation, "Mitigation of UE and gNB TX/RX Timing Errors," 3GPP TSG RAN WG1 #104e, R1-2100657, Jan. 25-Feb. 5, 2021, 12 pages.

Moderator (Catt), "FL Summary #5 for accuracy improvements by mitigating UE Rx/Tx and/or gNB Rx/Tx timing delays," 3GPP TSG RAN WG1 Meeting #104e, R1-2102204, Jan. 25-Feb. 5, 2021, 88 pages.

Vivo, "Discussion on methods for Rx/Tx timing delay mitigating," 3GPP TSG RAN WG1 #104-e, R1-2100445, Jan. 25-Feb. 5, 2021, 10 pages.

\* cited by examiner

+ WD TX
Timing Error
$T_{WD,Tx}$

UL

Propagation Delay T ($T_{WD,TRP}$)

+ TRP RX
Timing Error
$T_{TRP,Rx}$

300

400

+ WD RX
Timing Error
$T_{WD,Rx}$

DL

Propagation Delay T ($T_{TRP,WD}$)

+ TRP TX
Timing Error
$T_{TRP,Tx}$

S201 Transmitting, to the first WD, a configuration comprising one or more conditions that are to be satisfied for providing reference information S204 Receiving, from a first wireless device, WD, an indication indicative of the first WD being capable of providing reference information S205 Transmitting, to the first WD, an indication that the first WD is to provide reference information S206 Transmitting, to the first WD, a request to provide the reference information for providing assistance to the first network node S208 Obtaining the reference information for assisting the first network node in determining the network node property

S208A    S208B

S210 Determining the network node property based on the reference information

S212 Determining a position of one or more second WDs based on the property of the radio network node

METHOD FOR ASSISTING A FIRST NETWORK NODE IN DETERMINING A PROPERTY OF A NETWORK NODE, A RELATED FIRST NETWORK NODE AND A RELATED WIRELESS DEVICE

The present disclosure pertains to the field of wireless communications. The present disclosure relates to a method for determining a property of a network node, a method for assisting a first network node in determining a network node property, a related first network node and a related wireless device.

BACKGROUND

Various factors may affect some functionalities of a wireless communications system more than other functionalities. For example, signal transmissions may be prone to delays. Properties of devices participating in the communication (such as hardware properties and imperfections) may have an impact as well.

An example functionality affected is positioning. The $3^{rd}$ Generation Partnership Project (3GPP) Fifth Generation (5G) New Radio (NR) provides positioning features targeting high accuracy positioning of wireless devices. Positioning in 5G NR is used for example to support indoor factory deployments that require high accuracy positioning of objects for localization and automation purposes. For example, on a factory floor, it may be beneficial to locate assets and moving objects such as forklifts, or parts to be assembled. Similar needs exist in for example transportation and logistics.

NR positioning supports various positioning methods, such as Downlink-Time Difference of Arrival (DL-TDOA), Uplink-Time Difference of Arrival (UL-TDOA), and Multi Round Trip Time (Multi-RTT). These positioning techniques rely on timing measurements. The timing measurements reflect the distance between a wireless device and a radio network node such as a transmission point (TRP) or a gNB. In practice, there can be a timing error at the transmitter and/or receiver side. The timing error can be in a form of an additional timing delay related to the configuration of components (e.g., filters). The timing error can also vary depending on the selected components and operating conditions (e.g., temperature). Consequently, the timing error may affect the estimated position of the wireless device.

NR positioning enhancement is targeting, for example, a 20 cm accuracy for horizontal positioning accuracy requirements. The aforementioned timing error affects the positioning accuracy estimation. A timing error of 1 ns can for example result in a 30 cm deviation in positioning accuracy while a timing error of 50 ns can degrade the distance measurement accuracy by approximately 15 m.

SUMMARY

Accordingly, there is a need for devices and methods for assisting a first network node in determining a network node property, which mitigate, alleviate or address the shortcomings existing and provide a higher accuracy positioning of the wireless device.

A method is disclosed, performed by a first wireless device (WD) for assisting a first network node in determining a network node property. The method comprises determining whether the first WD satisfies one or more conditions for providing reference information. The method comprises, upon determining that the first WD satisfies the condition for providing the reference information, transmitting, to the first network node, an indication indicative of the first WD being capable of providing the reference information. The method comprises receiving, from the first network node, a request to provide the reference information. The method comprises providing, to the first network node, reference information for assisting the first network node in determining a network node property.

Further, a first wireless device is provided, the first wireless device comprising memory circuitry, processor circuitry, and a wireless interface, wherein the first wireless device is configured to perform any of the methods disclosed herein.

It is an advantage of the present disclosure that the first WD can provide reference information to the first network node which assists the first network node in determining the network node property. The determined network node property may be used by the first network node to mitigate measurement errors caused by the network node property. The reference information may assist the first network node in determining, for example, a timing error of the radio network node as the network node property, which may be used to compensate for and/or mitigate a positioning error caused by the radio network node and increase accuracy of positioning estimation of one or more second WDs performed on reference signal transmissions associated with the radio network node.

Further, a method is disclosed, performed by a first network node, for determining a network node property. The method comprises receiving, from a first wireless device (WD), an indication indicative of the first WD being capable of providing reference information. The method comprises transmitting, to the first WD, a request to provide the reference information for providing assistance to the first network node. The method comprises obtaining the reference information for assisting the first network node in determining the network node property. The method comprises determining the network node property based on the reference information.

Further, a first network node comprising memory circuitry, processor circuitry, and a wireless interface, wherein the first network node is configured to perform any of the methods disclosed herein.

It is an advantage of the present disclosure that the first network node can determine the network node property of the radio network node based on the reference information. The determined network node property may be used by the first network node to mitigate measurement errors caused by the network node property. The reference information may assist the first network node in determining for example a timing error of the radio network node as the network node property, which may be used to compensate for and/or mitigate a positioning error caused by the radio network node and increase the accuracy of positioning estimation of one or more second WDs performed on reference signal transmissions associated with the radio network node.

BRIEF DESCRIPTION OF THE DRAWINGS

The above and other features and advantages of the present disclosure will become readily apparent to those skilled in the art by the following detailed description of examples thereof with reference to the attached drawings, in which:

FIG. 6 is a flow-chart illustrating an example method, performed in a first network node of a wireless communication system, for determining a network node property according to this disclosure.

DETAILED DESCRIPTION

Figure 1:
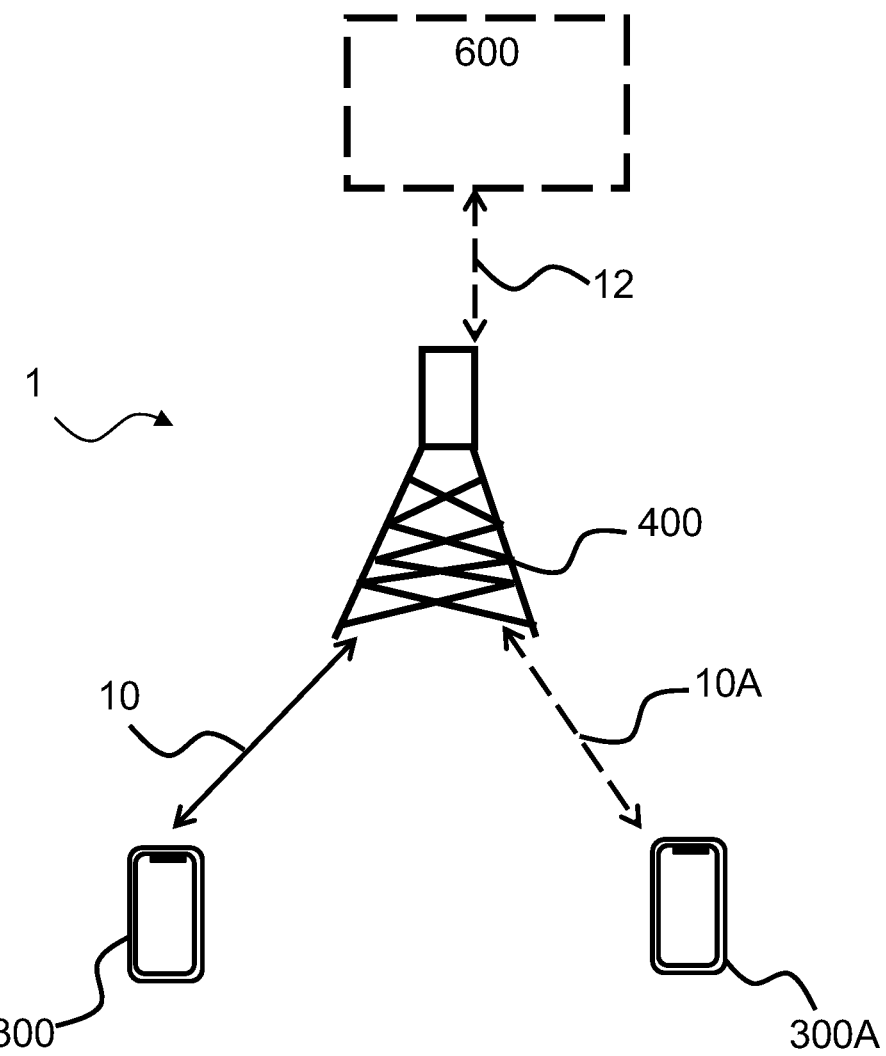
FIG. 1 is a diagram illustrating an example wireless communication system comprising an example core network node, an example radio network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example core network (CN) node 600, an example radio network node 400 and an example wireless device (WD) 300 according to this disclosure.

As discussed in detail herein, the present disclosure relates to a wireless communication system 1 comprising a cellular system, for example, a 3GPP wireless communication system. The wireless communication system 1 comprises the WD 300 and/or the radio network node 400.

The radio network node 400 may be configured to communicate with a core network node 600, such as a location network node 600, via a link 12.

A radio network node disclosed herein refers to a radio access network (RAN) node operating in the radio access network, such as a base station, an evolved Node B, eNB, gNB in NR. In one or more examples, the RAN node is a functional unit which may be distributed in several physical units.

A CN node disclosed herein refers to a network node operating in the core network, such as in the Evolved Packet Core Network, EPC, and/or a 5G Core Network, 5GC. Examples of CN nodes in EPC include a location network node, and/or a Mobility Management Entity, MME.

In one or more examples, the RAN node and/or the core network node is a functional unit which may be distributed in several physical units.

The wireless communication system 1 described herein may comprise one or more wireless devices 300, 300A, and/or one or more network nodes 400, such as one or more of: a base station, an eNB, a gNB and/or an access point.

A wireless device may refer to a mobile device and/or a user equipment, UE. The terms WD and UE may be used interchangeably herein.

The wireless devices 300, 300A may be configured to communicate with the network node 400 via a wireless link (or radio access link) 10, 10A.

In NR positioning various positioning methods, such as DL-TDOA, UL-TDOA, and Multi-RTT are supported. These positioning methods rely on timing measurements between a WD, such as a UE, and a radio network node, such as a TRP and/or a gNB. The timing measurements reflect the distance between the WD and the TRP (or gNB). In practice, there can be a timing error in the transmitter (Tx) side, herein also referred to as Tx timing error, and/or the receiver (Rx) side, herein also referred to as Rx timing error, of the WD and/or the radio network node. Consequently, the timing error may affect the estimate of the WD position.

A Tx timing error can be seen from a signal transmission perspective. When transmitting a signal there will be a time delay from the time when the digital signal is generated at a baseband of the transmitting device to the time when a Radio Frequency (RF) signal is transmitted from the Tx antenna(s) of the transmitting device. This time delay may be referred to as a Tx timing error.

In order to support positioning, the WD and/or the radio network node, such as the TRP and/or gNB, may implement an internal calibration and/or compensation of the Tx time delay for the transmission of a reference signal for positioning, such as a Positioning Reference Signal (PRS) in DL and/or Sounding Reference Signals (SRS) in UL. This may also include a calibration and/or compensation of a relative time delay between different RF chains in the same WD and/or radio network node. An RF chain herein is a cascade of electronic components and sub-units which may include amplifiers, filters, mixers, attenuators and detectors. The compensation may also possibly consider an offset of a Tx antenna phase center to a physical antenna center. The antenna phase center herein may be seen as the apparent source of radiation, such as the apparent source of the reference signal transmission.

An Rx timing error can be seen from a signal reception perspective. When receiving a signal there will be a time delay from the time when the RF signal arrives at the Rx antenna(s) of the receiving device to the time when the signal is digitized and time-stamped at the baseband of the receiving device. This time delay may be referred to as an Rx timing error.

In order to support positioning, the WD and/or the radio network node may implement an internal calibration and/or compensation of the Rx time delay before it reports the measurements that are obtained from the reference signal for positioning, such as the PRS in DL and/or SRS in UL, which may also include the calibration and/or compensation of the relative time delay between the different RF chains in the same WD and/or radio network node. The compensation may also possibly consider the offset of the Rx antenna phase center to the physical antenna center.

However, these calibrations may not be perfect. The remaining Tx time delay after the calibration and/or compensation, or the uncalibrated Tx time delay, may herein be referred to as a Tx timing error. In other words, the Tx timing error is a timing error at the transmitter side in the transmitting device, such as the radio network node in DL and the WD in UL.

An Rx timing error is a timing error at the receiver side in the receiving device, such as the radio network node in UL and the WD in DL.

The timing error can be due to configuration and operating conditions of the radio network node and/or the WD. Different configurations and/or operating conditions (such as temperature) may change the timing error. Hence, the calibrations may be updated over time to reduce the timing error.

Figure 2:
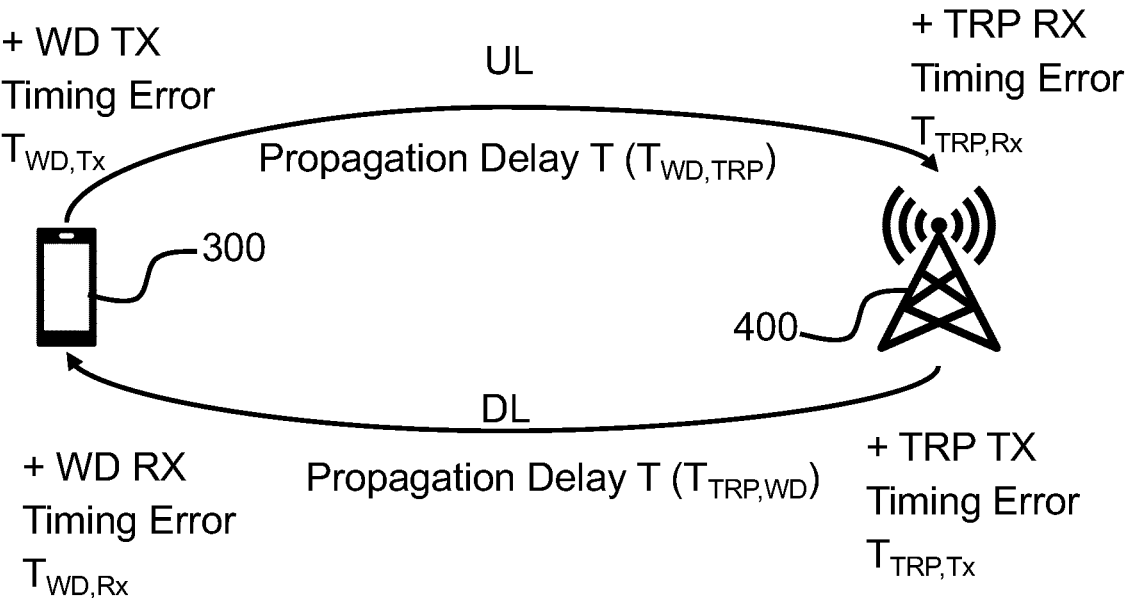
FIG. 2 is a diagram illustrating an exemplary Tx/Rx timing error at a WD and a radio network node.

FIG. 2 illustrates how the Tx timing error and/or Rx timing error affect the DL and/or UL timing measurement. In UL SRS timing measurements, the total timing measurement is the sum of the propagation delay from the WD to the radio network node ($T_{WD,TRP}$), the WD Tx timing error ($T_{WD,Tx}$) and the radio network node Rx timing error $T_{TRP,Rx}$, which is $T_{WD,TRP}+T_{WD,Tx}+T_{TRP,Rx}$. Likewise, in DL PRS, the total timing measurement is the sum of the propagation delay ($T_{TRP,WD}$), the WD Rx timing error ($T_{WD,Rx}$) and the radio network node Tx timing error ($E_{TRP,Tx}$), such as $T_{TRP,WD}+T_{WD,Rx}+T_{TRP,Tx}$. The propagation delay can be seen as the propagation time between the WD and the radio network node.

NR positioning enhancement is targeting 20 cm accuracy for horizontal positioning accuracy requirements. The aforementioned timing errors may, however, affect the positioning accuracy estimation. As a rule of thumb, a timing error of 50 ns degrades the distance measurement accuracy by 15 m.

For DL-based positioning, the radio network node Tx timing error results in the same positioning accuracy degradation for all WDs performing DL-based positioning on reference signals, such as PRS, received from that particular radio network node. The reference signals received at all of the WDs will experience the same Tx timing error from each individual radio network node. Furthermore, each WD may have its own Rx timing error. A WD which has multiple Rx branches may have multiple Rx timing errors.

For UL-based positioning, the radio network node Rx branch timing error results in the same positioning accuracy degradation of all WDs performing UL-based positioning. The received reference signals, such as SRS, at the radio network node Rx branch will have the same Rx timing error. Furthermore, each WD may have its own Tx timing error.

The current disclosure thus provides a solution for compensation of radio network node, such as TRP and/or gNB, Tx timing error and/or Rx timing error. Thereby a positioning accuracy of all WDs may be improved.

The Time Difference of Arrival (TDOA) measurements, such as DL-TDOA and/or UL-TDOA, require multiple radio network nodes, such as multiple TRPs and/or gNBs, since the measurements are time difference measurements.

Figure 3:
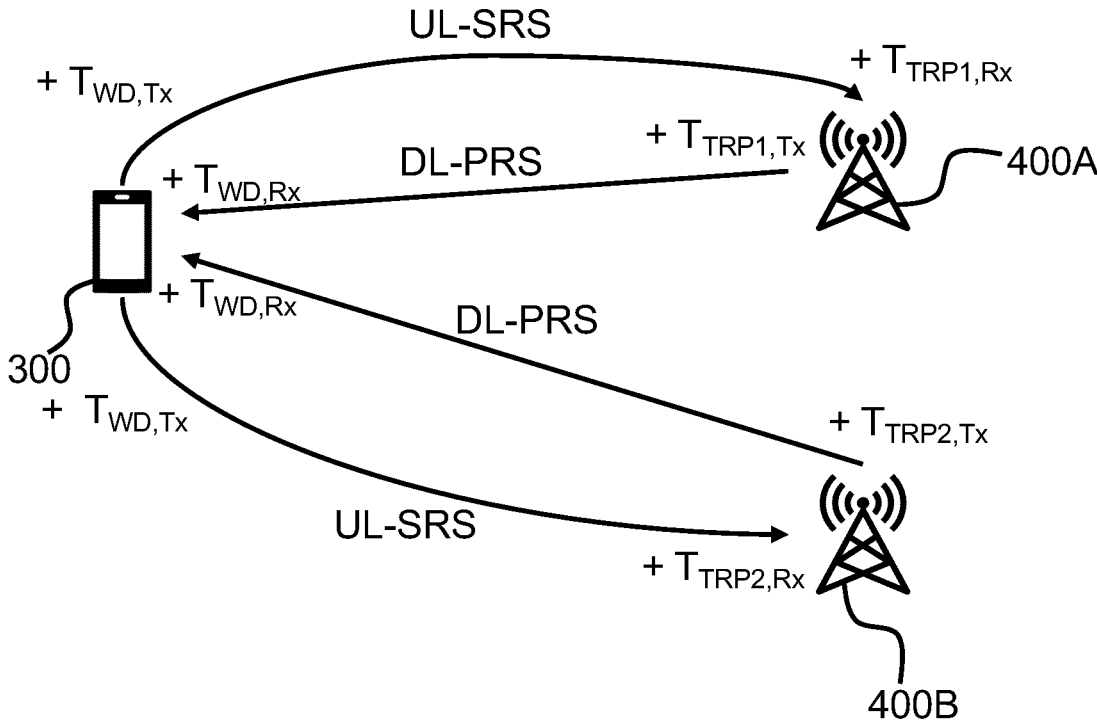
FIG. 3 is a diagram illustrating an exemplary Tx/Rx timing error of the WD and the radio network node during a Time Difference of Arrival measurement.

FIG. 3 illustrates how the Tx and/or Rx timing errors of the WD and/or the radio network node affect the final TDOA measurement. In DL-TDOA, the reported measurement is the difference between two Times of Arrival (TOAs) at two different radio network nodes, such as a first network node 400A and a second network node 400B, of a reference signal transmitted from a WD 300. The measurement of the time difference between the two TOAs may also be referred to as Reference Signal Time Difference (RSTD) measurement. A first TOA may be from the WD 300 to a first radio network node 400A, such as a reference radio network node, such as a serving radio network node. The second TOA may be from the WD 300 to a second radio network node 400B, such as a neighbor radio network node neighboring the first network node 400A.

The time difference may be calculated by subtracting the two TOAs from each other. While calculating the subtraction of the two TOAs, the WD timing error (such as $T_{WD,Rx}$ and/or $T_{WD,Tx}$ of the WD 300 in FIG. 3) will always be cancelled out, since that is the common term in the two TOAs. More specifically, the WD Tx timing error ($T_{WD,Tx}$) is a part of the TOA in UL SRS measurement, but it would be cancelled out in the calculation of TDOA. Likewise, in a DL PRS measurement, the WD Rx timing error ($T_{WD,Rx}$) would also be compensated. Therefore, in DL-TDOA or UL-TDOA, only the timing errors, such as TX and/or RX timing errors, of the radio network nodes, such as the first radio network node 400A and the second network node 400B have to be considered. Typically, the timing error in the first radio network node 400A (such as $T_{TRP1,Tx}$ and/or $T_{TRP1,Rx}$ in FIG. 3) and the second radio network node 400B (such as $T_{TRP2,Tx}$ and/or $T_{TRP2,Rx}$ in FIG. 3) are not the same. The timing error of the WD is typically due to a filter group delay in RF and baseband processing, such as inside a WD circuit. The WD is normally aware or has knowledge of its filter characteristic. Hence, the WD timing error may be known by the WD. The delay, such as the timing error, of the circuit is typically known or can be measured by the manufacturer of the WD and may in one or more examples be stored in a Look Up Table (LUT).

Figure 4:
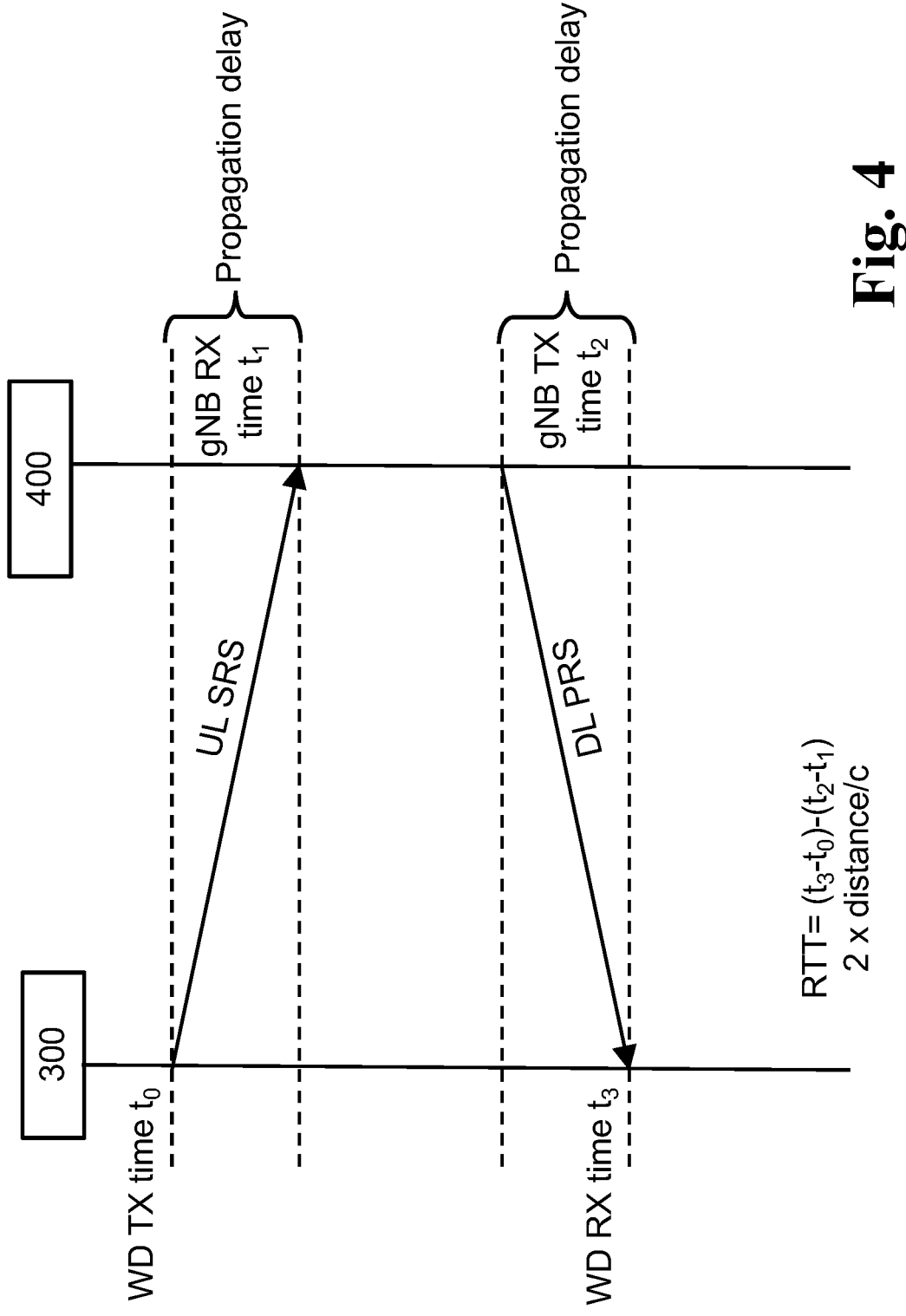
FIG. 4 is a signaling diagram illustrating a Multi-RTT positioning method.

FIG. 4 illustrates an example method for Multi-RTT positioning. In Multi-RTT positioning a time difference between a time t0 at which the WD 300 transmits an UL reference signal, such as an UL SRS, and a time t3 at which the WD 300 receives a DL reference signal, such as a DL PRS, is determined, such as measured. Further, a time difference between a time t1 at which the radio network node 400 receives the UL reference signal and a time t2 at which the radio network node 400 transmits the DL reference signal is determined. The RTT may be determined based on the determined time differences, such as according to the formula RTT=[t3−t0]−[t2−t1]. The determined time differences may be reported to a location server for estimating the position of the WD. Since the RTT takes two propagation delays of the signal transmission between the WD 300 and the radio network node 400 into account, the RTT is indicative of two times the distance between the WD 300 and the radio network node 400. However, in Multi-RTT positioning, the WD timing error would be part of the RTT measurement and would not be compensated for, since for Multi-RTT it is not the time of arrival difference related to DL reference signal transmissions received from different radio network nodes at a WD or UL reference signal transmissions transmitted by the WD and measured by different radio network nodes that is calculated. According to the current disclosure, the WD Tx/Rx timing error may be estimated prior to the positioning procedure. Thereby, the timing error can be compensated for and/or removed.

A method for estimating the timing error and reporting the estimated timing error is disclosed herein. The timing error may in one or more example methods herein, be reported to a location network node, such as a location server (LS), so that the location network node can minimize and/or compensate for a timing error for a positioning estimation of one or more WDs.

The current disclosure provides a method of enabling and/or disabling one or more first WDs to become reference WDs. This can be done autonomously. The reference WD may be a WD providing reference information for assisting a first network node, such as a location network node, to determine a network node property, such as a property of itself or a property of a second network node, such as a radio network node. The reference information may in one or more example methods be provided to the first network node upon request from the first network node. The determined property of the network node may, in one or more example methods, be used for enabling positioning of one or more second WDs, such as to mitigate a timing error during positioning procedures for estimating a position of one or more second WDs. The method may comprise classifying the one or more reference WDs based on the reference information they can provide, such as based on the method used for determining a timing error and/or an obtained location information. Autonomously herein means that any WD in a cell of a radio network node can be a reference WD as long as certain conditions and/or requirements are fulfilled. In one or more example methods, the reference WDs may be selected manually (such as not autonomously).

Figure 5:
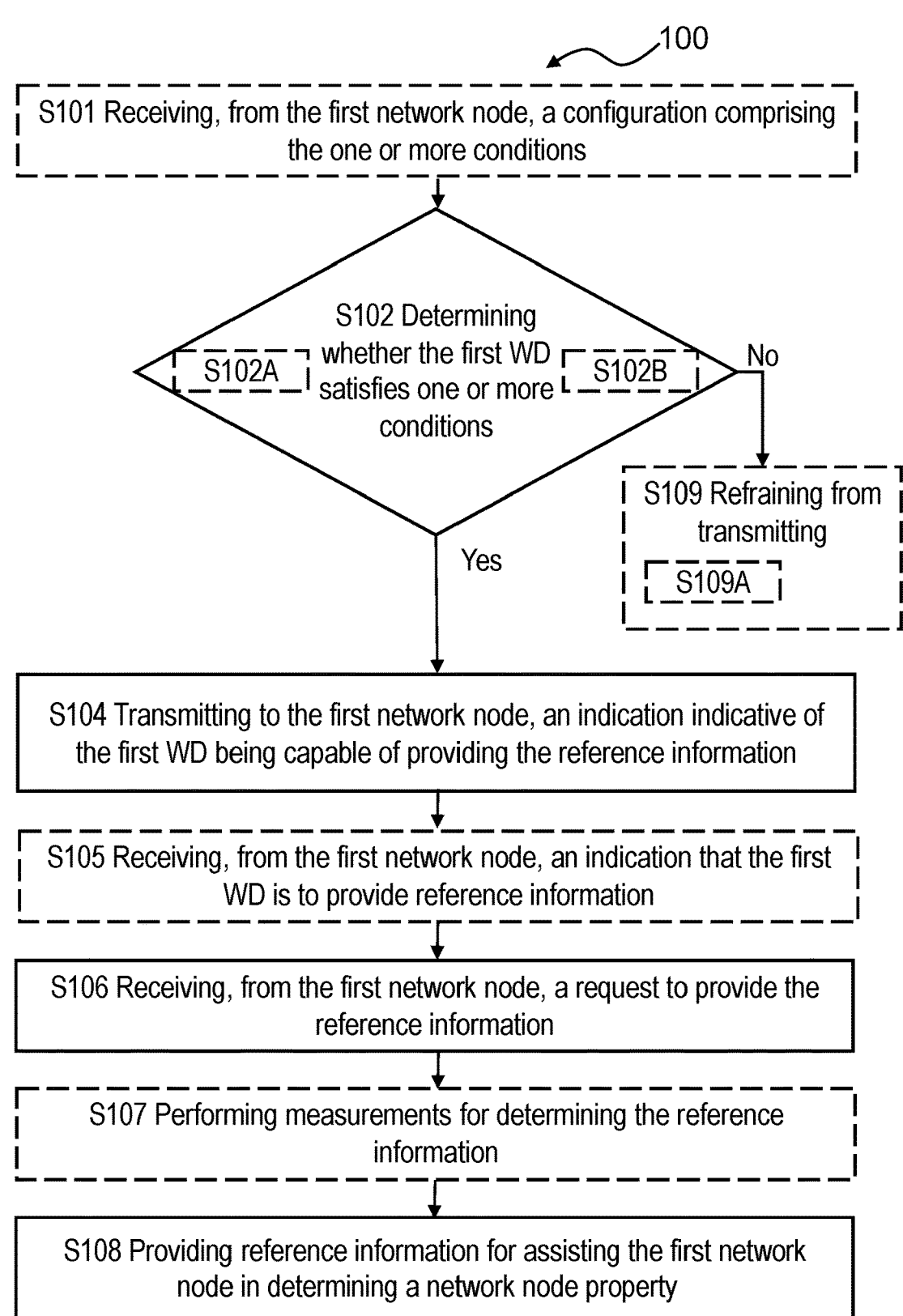
FIG. 5 is a flow-chart illustrating an example method, performed in a first wireless device of a wireless communication system, for assisting a first network node in determining a network node property according to this disclosure.

FIG. 5 shows a flow diagram of an example method 100, performed by a first wireless device according to the disclosure, for assisting a first network node (such as radio network node 400, of FIG. 1, FIG. 2, FIG. 4, FIG. 8 and FIG. 10, 400A, 400B of FIG. 3 or core network node 600 of FIG. 1, FIG. 9 and FIG. 10) in determining a network node property. The first wireless device may be a wireless device disclosed herein, such as wireless device 300 of FIG. 1, FIG. 2, FIG. 3, FIG. 4, FIG. 7, or 300A of FIG. 1, FIG. 10.

The method 100 comprises, determining S102 whether the first WD satisfies one or more conditions for providing reference information. In one or more example methods, the reference information may be seen as information used as reference for enabling positioning of one or more second WDs. In one or more example methods, the condition can be that the first WD can obtain an estimate of its position and/or orientation with a total uncertainty less than a threshold. The one or more conditions may comprise a movement condition of the WD, such as whether the WD is stationary, temporarily stationary or moving. The one or more conditions may comprise a positioning accuracy of the WD, such as an accuracy of an estimated position of the WD. In one or more example methods, the one or more conditions comprise a threshold related to the first WD, such as a threshold for positioning accuracy of the WD. The threshold for positioning accuracy may be indicated as a distance, such as a distance in cm. In one or more example methods, determining S102 comprises determining S102A whether the positioning uncertainty of the first WD is below the threshold, such as the threshold for positioning accuracy. In one or more example methods, the condition may comprise a channel condition for the first WD. The channel condition may comprise a quality metric of the channel, such as Reference Signal Received Power (RSRP), Reference Signal Received Quality (RSRQ), Channel Quality Indicator (CQI), Carrier Received Signal Strength Indicator (RSSI) and/or Signal to Interference plus Noise Ratio (SINR).

In one or more example methods, determining S102 whether the first WD satisfies the one or more conditions may comprise obtaining S102B a position of the WD. The position may, in one or more example methods, be obtained from legacy Radio Access Technology (RAT) dependent (such as DL-TDOA) positioning methods and/or RAT independent positioning methods (such as Global Navigation Satellite System (GNSS) based, Bluetooth (BT) based and/or sensor based). In one or more example methods, determining S102 whether the first WD satisfies the one or more conditions may comprise obtaining S102C a movement condition of the WD (such as whether the WD is stationary, temporarily stationary, or moving). A position may be seen as a location of the WD.

The method 100 comprises, upon determining that the first WD satisfies the condition for providing the reference information, transmitting S104, to the first network node, an indication indicative of the first WD being capable of providing the reference information. The indication may indicate to the first network node that the WD at a given time and/or period satisfies the conditions for providing reference information and is capable of becoming a reference device. This may, in one or more examples such as when the reference information is for estimating a position of one or more second WDs, be the case when the WD is stationary and has obtained an accurate position, such as a position that is obtained with a positioning accuracy below the positioning accuracy threshold. The accurate position can be obtained for example using GNSS with Real-Time-Kinetic (RTK), so that a centimeter level accuracy of the position can be obtained. Furthermore, a positioning estimate with a good channel condition, such as a channel condition above a channel condition threshold, can result in high positioning accuracy. In one or more example methods, the reference information may be reference information for positioning of one or more second WDs.

The indication indicative of the first WD being capable of providing the reference information may, in one or more example methods, comprise the position of the first WD. The indication indicative of the first WD being capable of providing the reference information may in one or more example methods comprise an indication of a positioning method used for obtaining the position of the first WD. In one or more example methods, the indication indicative of the first WD being capable of providing the reference information may comprise a quality and/or uncertainty, such as the positioning uncertainty, of the reported position estimate when the position was obtained. The indication may in one or more examples indicate which positioning methods the first WD can use to estimate its position, as this information may assist the first network node in determining the network node property. In one or more example methods the first WD can also indicate to the network node that the first WD may no longer satisfy the conditions and may thus not be valid as a reference device (such as due to increases in mobility of the first WD and/or due to a technique enabling high positioning accuracy being no longer available to the first WD, such as due to deteriorating channel conditions, such as bad signal receptions). Hence, the first WDs capability to provide reference information, such as its capability to be a reference UE, can be a dynamic property which can change over time.

Different WDs may have different accuracy levels (such as granularity) of their known and/or estimated positions. The WDs satisfying the conditions may in one or more example methods be categorized based on the accuracy of their known and/or estimated position. A fixed WD configured manually may for example have a precise location. Categorization of the WDs may help the network node in utilizing a plurality of first WDs for providing reference information for determining the network node property. The first WD may in one or more example methods indicate the accuracy level (such as granularity) of its reported position. The first WDs, such as the reference WDs, may thus be categorized in classes and/or levels of first WDs.

The first WD may be a WD that is capable of self-measuring its timing error, such as a Tx timing error or Rx timing error, or is capable of obtaining a stored a possible timing error and/or delay from, for example, a look-up table.

In one or more example methods, the first WD may comply with the requirements of a reference WD, such as satisfying the conditions for providing reference information, when UL reference signals are transmitted from certain antenna panels, but not from others. A WD is typically equipped with multiple antenna panels, such as on the back, the sides and the top of the WD. In general, these panels are built differently and have different properties, and hence each panel may give rise to a distinct timing error. Thus, the indication may comprise a panel ID in a measurement report, or some other identifier of the quality of the measurement.

The method 100 comprises, receiving S106, from the first network node, a request to provide the reference information.

The method 100 comprises, providing 3108, to the first network node, reference information for assisting the first network node in determining a network node property. The reference information may be provided to the first network node by transmitting signaling indicative of the reference information to the first network node directly or via a radio network node. For example, the signaling indicative of the reference information may comprise one or more control messages indicative of the reference information. The reference information may be provided to the first network node upon receiving the request to provide reference information from the first network node. In one or more example methods, the first WD can be configured, such as by the first network node, with an interval and/or periodicity for providing the reference information. Providing S108 reference information may comprise providing the reference information to the first network node at the interval and/or with the periodicity for providing the reference information.

A network node property may be seen as a property (such as a feature and/or a characteristic) of a network node, indicative of a timing and/or quality aspect of a communication (such as transmission and/or reception). For example, the network node property may be indicative of a timing information associated with positioning of the WD associated with the network node. For example, the network node property may be indicative of a timing error at the transmitter and/or receiver of the network node.

In one or more example methods, the reference information for assisting is indicative of timing information of a signal transmission associated with a radio network node. A signal transmission associated with the radio network node herein means a signal transmission transmitted from and/or received by the radio network node. In one or more example methods, the signal transmission is a reference signal transmission for positioning, such as an UL SRS transmission and/or a DL PRS transmission.

In one or more example methods, the reference information, such as the timing information comprises a timing error estimation of the signal transmission associated with the radio network node. In one or more example methods, the reference information for assisting is indicative of one or more of: a propagation time of the signal transmission between the first WD and the radio network node, a timing error at a transmitter side in the first WD, a timing error at a receiver side in the first WD, a timing error at a transmitter side in the radio network node, and a timing error at a receiver side in the radio network node.

In one or more example methods, such as for DL PRS based positioning methods and/or Multi-RTT positioning methods, the reference information, such as the timing information comprises an estimated Rx timing error of the WD. The Rx timing error of the WD is typically due to a filter group delay in RF and baseband processing, such as inside a WD circuit. The WD is normally aware or has knowledge of its filter characteristic. Hence, the WD Rx timing error may be known by the WD. The delay, such as the timing error, of the circuit is typically known or can be measured by the manufacturer of the WD and may in one or more examples be stored in a Look Up Table (LUT). The WD may in one or more examples obtain the information from the LUT in order to estimate its Rx timing error. The WD may have multiple Tx/Rx branch and each branch may have its own timing error.

In one or more example methods, such as for DL PRS based positioning methods, the reference information, such as the timing information comprises an estimated Tx timing error of the radio network node. The Tx timing error at the radio network node may be obtained based on, such as by utilizing, the known WD position (such as the position determined by the first wireless device with a positioning accuracy below the threshold for positioning accuracy), an estimated WD position (such as obtained from downlink-based positioning), and an estimated WD Rx timing error. A delta between the known position and the estimated WD position can be considered due to Tx timing error at the radio network node and Rx timing error at the WD. By knowing the WD Rx timing error, the Tx timing error radio network node can be estimated, such as by the WD. The Tx timing error at the radio network node is a common timing error that affects all WDs that use the signal from that radio network node for DL positioning methods. Mitigating the radio network node Tx timing error may therefore improve the positioning estimate of those WDs.

In one or more example methods, the reference information, such as the timing information may comprise both the estimated Rx timing error of the WD and the Tx timing error of the radio network node. In further example where the first network node has obtained the reference WD position, the reference information, such as the timing information may comprise the positioning measurement (e.g., RSTD) and the WD Rx timing error. Here, the first network calculates the radio network node Tx timing error.

In one or more example methods, such as for UL SRS based positioning methods and/or Multi-RTT positioning methods, the reference information, such as the timing information comprises WD Tx timing error. The WD Tx timing error may be a nominal timing error configured at the time of manufacture of the WD, and/or an estimated timing error determined based on measurements performed by the first WD. The Tx timing error may in one or more examples be a residual error after having applied a calibration procedure.

In one or more example methods, such as for Multi-RTT positioning methods, the reference information, such as the timing information, may comprise an error of the WD Rx-Tx time difference. This enables a more compact reporting, compared to transmitting both WD Rx timing error and the WD Tx timing error. This is different than legacy multi-RTT reporting (as shown in FIG. 4), where there is no timing error report. In one or more example methods, the reference information, such as the timing information may comprise the radio network node Rx-Tx time difference (as shown in FIG. 4). In one or more example methods, the first WD may estimate radio network node Rx-Tx time difference (for example, by knowing its own position with good accuracy and having calibrated its known Rx and Tx errors to a better accuracy than the radio network node). Based on the reference information comprising the error of the WD RX-TX time difference, the first network node may obtain a sum of radio network node TX timing error and radio network node Rx timing error. Consequently, the sum of the radio network node TX and RX timing error, may be used for compensating for the same error when using Multi-RTT positioning for a second WD.

In one or more example methods, the first WD may comply with the requirements of a reference WD, such as satisfying the conditions for providing reference information, when UL reference signals are transmitted from certain antenna panels, but not from others. A WD is typically equipped with multiple antenna panels, such as on the back, the sides and the top of the WD. In general, these panels are built differently and have different properties, and hence each panel may give rise to a distinct timing error. The reference information may thus comprise a panel ID in a measurement report, or some other identifier of the quality of the measurement.

In one or more example methods, the reference information comprises validation information indicative of a time duration for which the reference information is valid. In one or more example methods, the validation information is indicative of a time duration for which the estimated WD Rx timing error and/or the estimated WD Tx timing error of the WD is valid. The first network node may use the validation information to identify if a timing error estimate is valid at a certain time and arrange a new WD Rx and/or Tx timing error measurement accordingly.

In one or more example methods, the method 100 comprises, upon determining that the first WD does not satisfy the condition for providing the reference information, refraining S109 from transmitting, to the first network node, an indication indicative of the first WD being capable of providing the reference information. Refraining S109 from transmitting the indication indicative of the first WD being capable of providing the reference information may in one or more example methods comprise indicating S109A, to the first network node, that the first WD no longer satisfies the conditions for providing reference information and may thus not be valid as a reference device. The first WD may notify the first network that the first WD may not be a reference WD any longer. This may for example be due to increased mobility of the first WD and/or due to a technique enabling high positioning accuracy being no longer available to the first WD, such as due to deteriorating channel conditions, such as bad signal receptions. Hence, the first WD's capability to provide reference information, such as its capability to be a reference UE, can be a dynamic property which can change, such as may be enabled and/or disabled, over time.

In one or more example methods, the method 100 comprises receiving S101, from the first network node, a configuration comprising the one or more conditions. The WD may receive the configuration in order to become a reference WD, such as becoming a WD for providing reference information to the first network node. The configuration may comprise a condition, such as a threshold, that has to be satisfied for the WD to become a reference WD. The condition may for example be that the first WD can obtain an estimate of its position and/or orientation with a total uncertainty, such as positioning uncertainty, less than the threshold.

In one or more example methods, the method 100 comprises receiving S105, from the first network node, an indication that the first WD is to provide reference information. The indication received from the first network node may indicate whether or not the first WD is enabled to provide reference information. This is particularly the case for positioning with WD-assisted mode. The WD may report positioning measurements, such as DL positioning measurements, such as DL-TDOA, and/or Multi RTT and the first network node may perform a positioning estimate for the first WD. After several measurements the first network node may identify that the position of the WD is fixed and with an accuracy that is below and/or meets the threshold for positioning accuracy.

In one or more example methods, the method 100 comprises performing S107 measurements for determining the reference information. The measurements for determining the reference information may in one or more examples comprise a DL PRS positioning measurement. The measurements for determining the reference information may in one or more examples comprise an UL SRS positioning measurement. The measurements for determining the reference information may in one or more examples comprise a Multi-RTT positioning measurement.

In one or more example methods, the network node property of the radio network node is a timing error at the radio network node. The timing error may, for example, be a timing error at a transmitter, such as the Tx timing error, and/or a receiver, such as the Rx timing error, at the radio network node.

In one or more example methods, the first WD and/or the radio network node may have multiple Tx branches, such as multiple transmitters, and/or multiple Rx branches, such as multiple receivers. The reference information may in one or more example methods comprise information indicative of which Tx branch, such as transmitter, and/or Rx branch, such as receiver, the timing error refers to. The information indicative of which Tx branch and/or Rx branch the timing error refers to may be a receiver and/or transmitter branch ID and/or type ID, such as an ID identifying the branch and/or the type of the transmitter and/or receiver. In one or more example methods, the reference information may comprise a branch ID, such as a Tx branch ID and/or an Rx branch ID.

The reference information may in one or more example methods comprise a PRS ID associated with the timing error of a PRS transmission for identifying the timing error for each Tx and/or Rx branch. The reference information may in one or more example methods, comprise an association, such as a mapping, of the branch ID and a PRS resource ID. For example, reference information may be indicative of the radio network node using Tx branch 1 for PRS resource ID1, Tx Branch 2 for PRS resource ID2, etc.

In one or more example methods, the first WD and/or the radio network node may have multiple RF chains and each RF chain may have its own timing error. The reference information may in one or more example methods comprise a PRS ID associated with the timing error for identifying the timing error for each RF chain. The reference information may in one or more example methods comprise a PRS ID associated with the timing error for identifying the timing error for each RF chain.

In one or more example methods, the first network node is a location network node. The location network node may use the reference information to determine the network node property of the radio network node. In one or more examples the location network node may determine a timing error, such as a Tx timing error and/or a Rx timing error, of the radio network node.

In one or more example methods, the first network node is the radio network node. The radio network node may, based on the reference information received from the first WD, determine a network node property of itself. In one or more examples the radio network node may determine its own timing error, such as its own Tx timing error and/or Rx timing error, based on the reference information from the first WD. When the first network node is the radio network node, the radio network node may transmit reference information comprising the timing errors, such as the Tx timing error and/or the Rx timing error of the radio network node to a location network node.

In one or more example methods, the reference information for providing assistance comprises reference information for providing assistance for positioning of the one or more second WDs. The reference information may in one or more example methods assist the first network node, such as the location network node, in determining a position of the one or more second WDs. The location network node may use the reference information from the first WD and/or the radio network node, to improve the accuracy of a positioning estimation during positioning of the one or more second WDs, such as by mitigating the timing errors at the radio network node during UL and/or DL positioning methods for positioning of the one or more second WDs.

FIG. 6 shows a flow diagram of an example method 200, performed by a first network node (such as network node 400, of FIG. 1, FIG. 2, FIG. 4, FIG. 8, FIGS. 9 and 400A, 400B of FIG. 3, or location network node 600 of FIG. 1, FIG. 9 and FIG. 10), for determining a network node property according to this disclosure.

The method 200 comprises receiving S204, from a first wireless device, WD, an indication indicative of the first WD being capable of providing reference information. The indication may indicate to the first network node that the WD at a given time and/or period satisfies the conditions for providing reference information and is capable of becoming a reference device. The indication may in one or more examples indicate which positioning methods the first WD can use to estimate its position, as this information may assist the first network node in determining the network node property.

In one or more example methods, the indication may indicate to the network node that the first WD may no longer satisfy the conditions and may thus not be valid as a reference device (such as due to increases mobility of the first WD and/or due to a technique enabling high positioning accuracy being no longer available to the first WD, such as due to deteriorating channel conditions, such as bad signal receptions). Hence, the first WD's capability to provide reference information, such as its capability to be a reference UE, can be a dynamic property which can change over time.

The first WD may in one or more example methods indicate the accuracy level (such as granularity) of its reported position. The first network node may, in one or more examples, categorize the first WD based on the accuracy level of the first WD. Categorization of the WDs may help the network node in utilizing a plurality of first WDs for providing reference information for determining the network node property.

In one or more example methods, the indication may comprise a panel ID in a measurement report, or some other identifier of the quality of the measurement.

Figure 10:
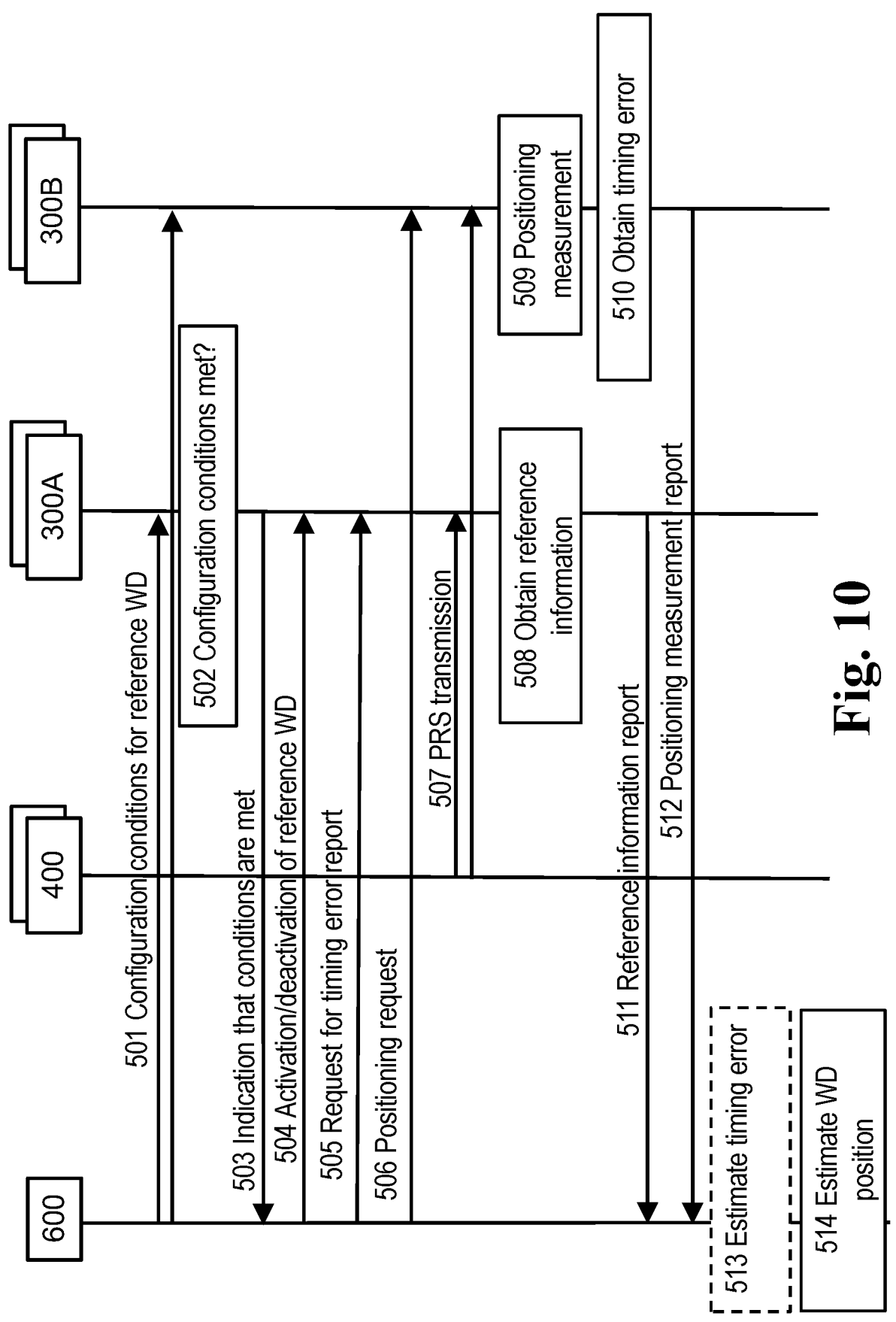
FIG. 10 is a signaling diagram illustrating an example method for downlink-based positioning of a wireless device according to this disclosure.

Receiving S204 corresponds to transmitting S104 of the first WD as described in relation to FIGS. 5 and 503 as described in relation to the signaling diagram of FIG. 10.

The method 200 comprises transmitting S206, to the first WD, a request to provide the reference information for providing assistance to the first network node. In one or more example methods, the first network node may transmit the request to provide reference information as part of a positioning method for one or more second WDs. The reference information may be used to improve the accuracy of the positioning estimate for the one or more second WDs, for example by mitigating the influence of the timing errors in the radio network node and/or the WDs on the positioning estimate of the one or more second WDs. Transmitting S206 corresponds to receiving S106 of the first WD as described in relation to FIGS. 5 and 505 as described in relation to the signaling diagram of FIG. 10.

The method 200 comprises obtaining S208 the reference information for assisting the first network node in determining the network node property. In one or more example methods, obtaining S208 reference information comprises receiving S208A reference information from the first WD. The reference information may be obtained by the first network node by receiving the reference information from the first WD directly or via a radio network node. In one or more example methods, obtaining S208 reference information comprises receiving S208B reference information from the radio network node. In one or more example methods the reference information may be obtained with an interval and/or periodicity for obtaining the reference information. Obtaining S208 corresponds to providing S108 of the first WD as described in relation to FIG. 5, and 511 as described in relation to the signaling diagram of FIG. 10.

In one or more example methods, the reference information for assisting is indicative of timing information of a signal transmission associated with the radio network node. A signal transmission associated with the radio network node herein means a signal transmission transmitted from and/or received by the radio network node. In one or more example methods, the signal transmission is a reference signal transmission for positioning, such as an UL SRS transmission and/or a DL PRS transmission.

In one or more example methods, the reference information, such as the timing information, comprises a timing error estimation of the signal transmission associated with the radio network node. The reference information for assisting may, for example, be indicative of one or more of: a propagation time of the signal transmission between the first WD and the radio network node, a timing error at a transmitter side in the first WD, a timing error at a receiver side in the first WD, a timing error at a transmitter side in the radio network node, and a timing error at a receiver side in the radio network node.

In one or more example methods, such as for DL PRS based positioning methods and/or Multi-RTT positioning methods, the reference information, such as the timing information comprises an estimated Rx timing error of the WD.

In one or more example methods, such as for DL PRS based positioning methods, the reference information, such as the timing information, comprises an estimated Tx timing error of the radio network node.

In one or more example methods, the reference information, such as the timing information may comprise both the estimated Rx timing error of the WD and the Tx timing error of the radio network node.

In one or more example methods, the reference information, such as the timing information may comprise both the estimated Rx timing error of the WD and the downlink positioning measurement report (e.g., RSTD report).

In one or more example methods, such as for UL SRS based positioning methods and/or Multi-RTT positioning methods, the reference information, such as the timing information, comprises a WD Tx timing error. The WD Tx timing error may be a nominal timing error configured at manufacturing time, and/or an estimated timing error determined based on measurements performed by the first WD. The Tx timing error may in one or more examples be a residual error.

In one or more example methods, such as for Multi-RTT positioning methods, the reference information, such as the timing information, may comprise an error of the WD Rx-Tx time difference.

In one or more example methods, the reference information may comprise a panel ID, a branch ID, such as a Rx branch ID and/or a Tx branch ID, a PRS resource ID, a receiver and/or transmitter branch ID and/or type ID, such as an ID identifying the branch and/or the type of the transmitter and/or receiver associated, or some other identifier of the quality of the measurement. The identifier may be an identifier for identifying the signal transmission related to the timing information.

In one or more example methods, the radio network node may have multiple Tx branches, such as multiple transmitters, and/or multiple Rx branches, such as multiple receivers. The reference information may in one or more example methods comprise information indicative of which Tx branch, such as transmitter, and/or Rx branch, such as receiver, the timing error refers to. The information indicative of which Tx branch and/or Rx branch the timing error refers to may be a receiver and/or transmitter branch ID and/or type ID, such as an ID identifying the branch and/or the type of the transmitter and/or receiver. In one or more example methods, the reference information may comprise a branch ID, such as a Tx branch ID and/or an Rx branch ID.

The reference information may in one or more example methods comprise a PRS ID. The PRS ID may be associated with the timing error of a PRS transmission for identifying the timing error for each Tx and/or Rx branch. The reference information may in one or more example methods, comprise an association, such as a mapping, of the branch ID and a PRS resource ID. For example, reference information may be indicative of the radio network node using Tx branch 1 for PRS resource ID1, Tx Branch 2 for PRS resource ID2, etc.

In one or more example methods, the first WD and/or the radio network node may have multiple RF chains and each RF chain may have its own timing error. The reference information may in one or more example methods comprise a PRS ID associated with the timing error for identifying the timing error for each RF chain. The reference information may in one or more example methods comprise a PRS ID associated with the timing error for identifying the timing error for each RF chain.

In one or more example methods, such as when the first network node is a location network node, the first network node may receive reference information comprising an association of reference signals and the Tx and/or Rx branch used at the radio network node from the radio network node.

The first network node may, in one or more example methods, identify the corresponding Tx branch and/or Rx branch based on the PRS ID.

In one or more example methods, the reference information comprises validation information indicative of a time duration for which the reference information is valid.

In one or more example methods, the validation information is indicative of a time duration for which the estimated Rx timing error and/or the estimated WD Tx timing error of the WD is valid. The first network node may use the validation information to identify if a timing error estimate is valid in a certain time and arrange a new WD Rx and/or Tx timing error measurement accordingly.

In one or more example methods, such as when the first network node is a location network node, the validation information is indicative of a time duration for which the estimated Rx timing error and/or the estimated Tx timing error of the radio network node is valid. The first network node, such as the location network node may use this information to decide how frequently a timing error measurement for the radio network node should be performed.

In one or more example methods, the method 200 comprises transmitting S201, to the first WD, a configuration comprising one or more conditions that are to be satisfied for providing reference information. In one or more example methods, transmitting S201 the configuration comprising one or more conditions that are to be satisfied for providing reference information may comprise broadcasting the configuration comprising the one or more conditions. In one or more example methods, the one or more conditions comprise a threshold related to the first WD. The threshold may in one or more example methods be a threshold for positioning accuracy of the WD. The condition may for example be that the first WD can obtain an estimate of its position and/or orientation with a total uncertainty, such as positioning uncertainty, less than the threshold. The one or more conditions may comprise a movement condition of the WD, such as whether the WD is stationary, temporarily stationary or moving. The one or more conditions may comprise a positioning accuracy of the WD, such as an accuracy of an estimated position of the WD. In one or more example methods, the condition may comprise a channel condition for the first WD. The channel condition may comprise a quality metric of the channel, such as Reference Signal Received Power (RSRP), Reference Signal Received Quality (RSRQ), Channel Quality Indicator (CQI), Carrier Received Signal Strength Indicator (RSSI) and/or Signal to Interference plus Noise Ratio (SINR). Transmitting S201 corresponds to receiving S101 of the first WD as described in relation to FIG. 5, and 511 as described in relation to the signaling diagram of FIG. 10.

In one or more example methods, the method 200 comprises transmitting S205, to the first WD, an indication that the first WD is to provide reference information. The indication received from the first network node may indicate whether the first WD is enabled and/or disabled to provide reference information. This may be the case for positioning with WD-assisted mode. The first network node may receive a plurality of positioning measurement reports, such as DL positioning measurements, such as DL-TDOA, and/or Multi RTT from the first WD and the first network node may perform a positioning estimate for the first WD for each positioning measurement report. After several measurements the first network node may identify that the position of the WD is fixed and with an accuracy below and/or meeting the threshold for positioning accuracy. The first network node may then assign the first WD to become a reference device for providing reference information by transmitting the indication. Transmitting S205 corresponds to receiving S105 of the first WD as described in relation to FIG. 5, and 504 as described in relation to the signaling diagram of FIG. 10.

The method 200 comprises determining S210 the network node property based on the reference information. A network node property may be seen as a property (such as a feature and/or a characteristic) of a network node, indicative of a timing and/or quality aspect of a communication (such as transmission and/or reception). For example, the network node property may be indicative of a timing information associated with positioning of the WD associated with the network node. For example, the network node property may be indicative of a timing error at the transmitter and/or receiver of the network node. In one or more example methods, the network node property comprises a timing error at the radio network node. In one or more example methods, the timing error is a timing error at a transmitter and/or receiver at the radio network node. Determining S210 corresponds to 513 as described in relation to the signaling diagram of FIG. 10.

In one or more example methods, the first network node is a location network node. The location network node may use the reference information to determine the network node property of the radio network node. In one or more examples the location network node may determine a timing error, such as a Tx timing error and/or a Rx timing error, of the radio network node In one or more example methods, the first network node is the radio network node. The radio network node may, based on the reference information received from the first WD, determine a network node property of itself. In one or more examples the radio network node may determine its own timing error, such as its own Tx timing error and/or Rx timing error, based on the reference information from the first WD. When the first network node is the radio network node, the radio network node may transmit reference information comprising the timing errors, such as the Tx timing error and/or the Rx timing error, of the radio network node to a location network node.

In one or more example methods, the reference information for providing assistance comprises reference information for providing assistance for positioning of one or more second WDs. The reference information may in one or more example methods assist the first network node, such as the location network node, in determining a position of the one or more second WDs. The location network node may use the reference information from the first WD and/or the radio network node, to improve the accuracy of a positioning estimation during positioning of the one or more second WDs, such as by mitigating the timing errors at the radio network node during UL and/or DL positioning methods for positioning of the one or more second WDs.

In one or more example methods, the method 200 comprises determining S212 a position of one or more second WDs based on the network node property of the radio network node. In one or more example methods, the reference information, such as the estimated timing errors, may be used by the first network node, such as the location network node, to improve the accuracy of positioning estimates for the one or more second WDs. In one or more example methods, the first network node applies the reported timing error when it estimates, such as calculates the estimation, of the WD position to compensate for the timing error in the positioning measurements that are affected by the timing errors. For example, if one or more WDs, such as the first WD and/or the one or more second WDs, perform downlink based positioning utilizing reference signals transmitted from a plurality of radio network nodes, herein referred to as TRP1, TRP2, and TRP3, then the first network node, such as the location network node, may apply the radio network node Tx timing errors of TRP1, TRP2, and TRP3 respectively. Furthermore, the first network node, such as the location network node, may apply the radio network node Tx timing errors of a specific Tx branch in TRP1, TRP2, and TRP3 respectively. In one or more examples, the first network node may compensate for the respective WD timing error of the one or more second WDs when determining the position of the one or more second WDs. In one or more example methods, each of the one or more WDs, such as the first WD and/or the one or more second WDs, reports their respective timing error to the first network node (such as their respective WD Rx timing error for DL and/or WD Tx timing error for UL). The respective timing error may be reported when the one or more WDs report the WD positioning measurement (for downlink-based positioning) and/or upon request from the first network node (for uplink-based positioning). In one or more example methods, the one or more WDs calibrate the reported positioning measurement, such that the reported timing positioning measurement is adjusted by taking the Rx timing error into account. The one or more WDs may then indicate to first network node that the positioning measurement report has been adjusted. In one or more example methods, the one or more WDs may provide, such as transmit, a capability indication indicating whether the WD can perform WD timing error estimation and/or self-compensation of the timing error.

In one or more example methods, such as for Multi-RTT positioning methods, the first network node, such as the location network node, uses the reference information, such as the timing error information, to compensate for the timing error when estimating the WD location based on radio network node Rx-Tx time difference and WD Rx-Tx time difference reports.

Determining S212 corresponds to 514 as described in relation to the signaling diagram of FIG. 10.

Figure 7:
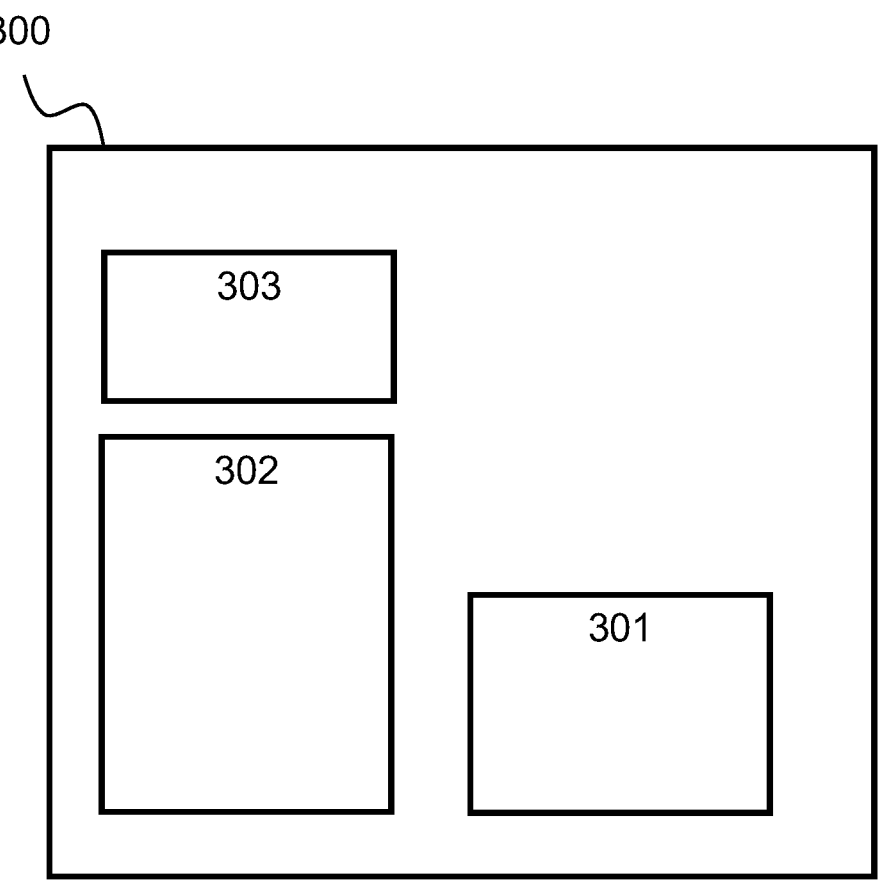
FIG. 7 is a block diagram illustrating an example first wireless device according to this disclosure.

FIG. 7 shows a block diagram of an example first WD (such as wireless device 300 of FIG. 1, FIG. 2, FIG. 3, FIG. 4, or 300A of FIG. 1, FIG. 10) according to the disclosure. The WD 300, 300A comprises memory circuitry 301, processor circuitry 302, and a wireless interface 303. The wireless device 300, 300A may be configured to perform any of the methods disclosed in FIG. 5. In other words, the wireless device 300, 300A may be configured for assisting a first network node (such as the radio network node 400, of FIG. 1, FIG. 2, FIG. 4, FIG. 8, FIGS. 10 and 400A, 400B of FIG. 3, or the location network node 600 of FIG. 1, FIG. 9, FIG. 10) in determining a network node property.

The first wireless device 300, 300A is configured to determine (such as by using a processor circuitry 302) whether the first WD satisfies one or more conditions for providing reference information.

The first wireless device 300, 300A is configured to, upon determining that the first WD satisfies the condition for providing the reference information, transmit (such as using a wireless interface 303) to the first network node, an indication indicative of the first WD being capable of providing the reference information.

The first wireless device 300, 300A is configured to receive (such as using a wireless interface 303), from the first network node, a request to provide the reference information.

The first wireless device 300, 300A is configured to provide, to the first network node, reference information for assisting the first network node in determining a network node property.

The wireless interface 303 is configured for wireless communications via a wireless communication system, such as a 3GPP system, such as a 3GPP system supporting one or more of: New Radio (NR), Long Term Evolution (LTE), Narrow-band IoT (NB-IoT), and Long Term Evolution-enhanced Machine Type Communication (LTE-M).

The first wireless device 300 is optionally configured to perform any of the operations disclosed in FIG. 5 (such as any one or more of S101, S102A, S102B, S105, S107, S109). The operations of the first wireless device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the first wireless device 300 may be considered a method that the first wireless device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 7). Memory circuitry 301 is considered a non-transitory computer readable medium.

Memory circuitry 301 may be configured to store information such as conditions for providing reference information, reference information, and/or timing information, in a part of the memory.

Figure 8:
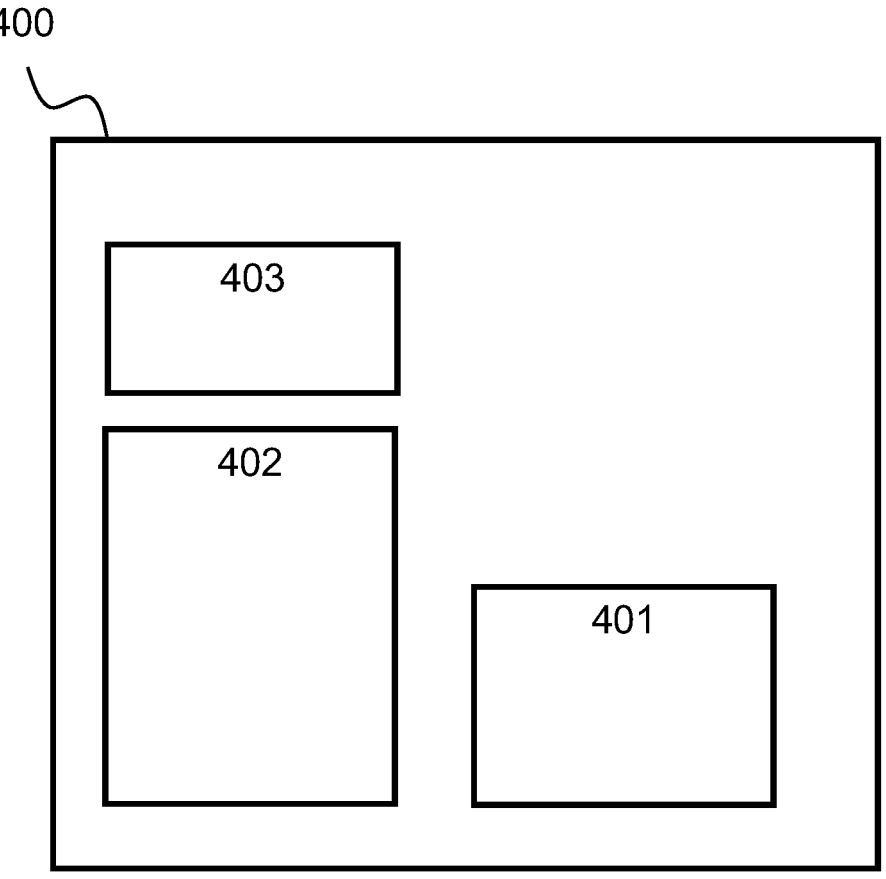
FIG. 8 is a block diagram illustrating an example radio network node according to this disclosure.

FIG. 8 shows a block diagram of an example radio network node 400 acting as a first network node, such as radio network node 400, of FIG. 1, FIG. 2, FIG. 4, Fig, FIGS. 10 and 400A, 400B of FIG. 3) according to the disclosure. The radio network node 400 comprises memory circuitry 401, processor circuitry 402, and an interface 403, such as a wired and/or wireless interface. The radio network node 400 may be configured to perform any of the methods disclosed in FIG. 6. In other words, the radio network node 400 may be configured for determining a network node property.

The radio network node 400, is configured to receive (such as using a wireless interface 403), from a first wireless device, WD, an indication indicative of the first WD being capable of providing reference information.

The radio network node 400, is configured to transmit (such as using an interface 403), to the first WD, a request to provide the reference information for providing assistance to the first network node.

The radio network node 400, is configured to obtain the reference information for assisting the radio network node in determining the network node property.

The radio network node 400, is configured to determine (such as by using a processor circuitry 402) the network node property based on the reference information.

The interface 403 is configured for wireless communications via a wireless communication system, such as a 3GPP system, such as a 3GPP system supporting millimeter-wave communications (also known as Frequency Range (FR2) and beyond), such as millimeter-wave communications in licensed bands, such as device-to-device millimeter-wave communications in licensed bands.

The interface 403 is configured to communicate with a core network node, such as the location network node disclosed herein (such as a location server), via a wired and/or wireless communication system.

Processor circuitry 402 is optionally configured to perform any of the operations disclosed in FIG. 6 (such as any one or more of S201, S205, S208A, S208B, S212). The operations of the radio network node 400, may be embodied in the form of executable logic routines (for example, lines of code, software programs, etc.) that are stored on a non-transitory computer readable medium (for example, memory circuitry 401) and are executed by processor circuitry 402).

Furthermore, the operations of the radio network node 400 may be considered a method that the radio network node 400, is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 8). Memory circuitry 401 is considered a non-transitory computer readable medium.

Memory circuitry 401 may be configured to store information such as conditions for providing reference information, reference information, and/or timing information, in a part of the memory.

Figure 9:
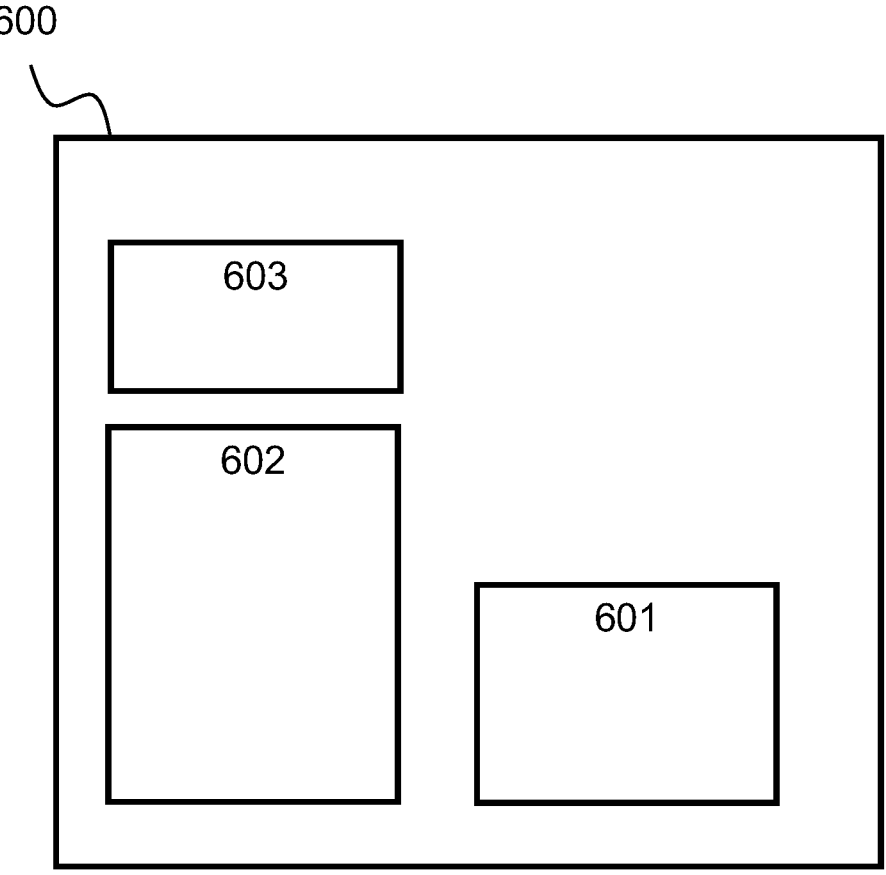
FIG. 9 is a block diagram illustrating an example location network node according to this disclosure.

FIG. 9 shows a block diagram of an example location network node 600 acting as a first network node (such as location network node 600, of FIG. 1 and FIG. 10) according to the disclosure. The first network node, such as location network node 600, comprises memory circuitry 601, processor circuitry 602, and an interface 603. The first network node, such as location network node 600, may be configured to perform any of the methods disclosed in FIG. 6. In other words, the location network node 600, may be configured for determining a network node property.

The location network node 600, is configured to receive (such as by using the interface 603), from a first wireless device, WD, an indication indicative of the first WD being capable of providing reference information.

The location network node 600, is configured to transmit (such as by using the interface 603), to the first WD, a request to provide the reference information for providing assistance to the first network node.

The location network node 600, is configured to obtain (such as by using the interface 603) the reference information for assisting the first network node in determining the network node property.

The location network node 600, is configured to determine (such as by using a processor circuitry 602) the network node property based on the reference information.

The interface 603 is configured to communicate with a network node disclosed herein (such the radio network node) and/or a wireless node disclosed herein via a wired and/or wireless communication system.

Processor circuitry 602 is optionally configured to perform any of the operations disclosed in FIG. 6 (such as any one or more of S201, S205, S208A, S208B, S212). The operations of the location network node 600, may be embodied in the form of executable logic routines (for example, lines of code, software programs, etc.) that are stored on a non-transitory computer readable medium (for example, memory circuitry 601) and are executed by processor circuitry 602).

Furthermore, the operations of the location network node 600, may be considered a method that the location network node 600, is configured to carry out. Also, while the described functions and operations may be implemented in software, such functionality may also be carried out via dedicated hardware or firmware, or some combination of hardware, firmware and/or software.

Memory circuitry 601 may be one or more of a buffer, a flash memory, a hard drive, a removable media, a volatile memory, a non-volatile memory, a random access memory (RAM), or other suitable device. In a typical arrangement, memory circuitry 601 may include a non-volatile memory for long term data storage and a volatile memory that functions as system memory for processor circuitry 602. Memory circuitry 601 may exchange data with processor circuitry 602 over a data bus. Control lines and an address bus between memory circuitry 601 and processor circuitry 602 also may be present (not shown in FIG. 9). Memory circuitry 601 is considered a non-transitory computer readable medium.

Memory circuitry 601 may be configured to store information such as conditions for providing reference information, reference information, and timing information, in a part of the memory.

FIG. 10 discloses a signaling diagram illustrating a method according to one or more examples of the current disclosure, wherein reference information from a first WD 300A is used by a first network node, which in this example is the location network node 600, for DL-based positioning of one or more second WDs 300B.

The location network node 600 transmits a configuration 501 comprising one or more conditions that a WD is to satisfy in order to become a reference WD for providing reference information for positioning of the one or more second WDs, to one or more WDs. The configuration may be transmitted, such as broadcasted, to one or more WDs, such as one or more first WDs 300A and or one or more second WDs 300B. This corresponds to S101 of the method of FIG. 5 and S201 of the method of FIG. 6.

The first WD 300A may obtain its position and determine 502 that the requirements of the configuration are met, such that the first WD satisfies the one or more conditions comprised in the configuration 501. This is similar to S102, S102A, S102B of the method of FIG. 5.

The first WD 300A transmits, to the location network node 600, an indication 503 indicating that the requirements are met and that the first WD 300A satisfies the one or more conditions of the configuration. This corresponds to S104 of the method of FIG. 5 and S204 of the method of FIG. 6.

After receiving the indication 503 from the first WD 300A, the location network node 600 may transmit an indication 504 to the first WD 300A indicating that the first WD 300A is enabled, such as activated, for being a reference WD and for providing reference information. In one or more example methods, the indication 504 may indicate that the first WD 300A is disabled, such as deactivated, from being a reference WD and for providing reference information. This is similar to S105 of the method of FIG. 5 and to S205 of the method of FIG. 6.

The location network node 600 transmits, to the first WD 300A, a request 505 for a timing error report, to be used for positioning of one or more second WDs 300B. This is similar to S105 of the method of FIG. 5 and to S205 of the method of FIG. 6.

The previous signaling 501-505 may relate to a method for determining and/or selecting a first WD for providing reference information, such as for becoming a reference WD, which process may be performed separate from and/or prior to performing a positioning method using the reference information. In case the reference information is used for a positioning method, the method may further comprise the following signaling.

The location network node 600 may transmit, to the one or more second WDs 300B, a request 506 for performing positioning measurements.

The radio network node 400 broadcasts DL PRS 507 that may be received by the first WD 300A and the one or more second WDs 300B.

The first WD 300A obtains reference information 508 for assisting positioning of the one or more second WDs 300B, such as Tx timing error of the radio network node 400 and/or of Rx timing error of the first WD 300A, based on measurements performed on the DL PRS received from the radio network node 400. This is similar to S107 of the method of FIG. 5.

The one or more second WDs 300B perform positioning measurements 509 on the DL PRS received from the radio network node 400.

The one or more second WDs 300B obtain their own estimated Rx timing error 510.

The first WD 300A transmits, to the location network node 600, a reference information report 511, comprising the reference information 508, such as such as Tx timing error of the radio network node 400 and/or of Rx timing error of the first WD 300A. This is similar to S108 of the method of FIG. 5 and to S208, S208A, and S208B of the method of FIG. 6.

The one or more second WDs 300B provide a positioning measurement report 512 to the location network node 600, wherein the positioning measurements comprised in the report are compensated for using the respective estimated Rx timing error of the one or more second WDs. The reference information report 511 and positioning measurement report 512 may be based on the same PRS transmission (e.g., PRS resource or PRS-resource-set) or two separate PRS transmissions (e.g., different PRS resource or different PRS-resource-set).

The location network node 600 may, in one or more example methods, estimate a timing error 513 of the radio network node 400 based on the reference information report 511 and/or the positioning measurement report 512. This is similar to S210 of the method of FIG. 6. This is particularly the case when the reference information report 511 does not include radio network timing error.

The location network node 600 estimates a position 514 of the one or more second WDs based on the reference information. In one or more example methods, the location network node, estimates the position 514, at least in part, on the estimated timing error 513 of the radio network node. This is similar to S212 of the method of FIG. 6.

Examples of methods and products (first wireless device and first network node) according to the disclosure are set out in the following items:

Item 1. A method, performed by a first wireless device, WD, for assisting a first network node in determining a network node property, the method comprising:

determining (S102) whether the first WD satisfies one or more conditions for providing reference information, upon determining that the first WD satisfies the condition for providing the reference information, transmitting (3104), to the first network node, an indication indicative of the first WD being capable of providing the reference information, receiving (S106), from the first network node, a request to provide the reference information, and providing (S108), to the first network node, reference information for assisting the first network node in determining a network node property.

Item 2. The method according to Item 1, wherein the reference information for assisting is indicative of timing information of a signal transmission associated with a radio network node.

Item 3. The method according to Item 2, wherein the timing information comprises a timing error estimation of the signal transmission associated with the radio network node.

Item 4. The method according to Item 2 or 3, wherein the reference information is indicative of one or more of: a propagation time of the signal transmission between the first WD and the radio network node, a timing error at a transmitter side in the first WD, a timing error at a receiver side in the first WD, a timing error at a transmitter side in the radio network node, and a timing error at a receiver side in the radio network node.

Item 5. The method according to any one of the Items 2 to 4, wherein the reference information comprises validation information indicative of a time duration for which the reference information is valid.

Item 6. The method according to any one of the Items 2 to 5, wherein the signal transmission is a positioning reference signal transmission.

Item 7. The method according to any one of the preceding Items, wherein the network node property of the radio network node is a timing error at the radio network node.

Item 8. The method according to Item 7, wherein the timing error is a timing error at a transmitter and/or receiver at the radio network node.

Item 9. The method according to any one of the preceding Items, wherein the reference information for providing assistance comprises reference information for providing assistance for positioning of the one or more second WDs.

Item 10. The method according to any one of the preceding Items, wherein the method comprises:

receiving (S101), from the first network node, a configuration comprising the one or more conditions.

Item 11. The method according to any one of the preceding Items, wherein the one or more conditions comprise a threshold related to the first WD.

Item 12. The method according to Item 11, wherein determining (3102) comprises:

determining (S102A) whether the positioning uncertainty of the first WD is below the threshold.

Item 13. The method according to any one of the preceding Items, wherein the method comprises:

performing (S107) measurements for determining the reference information.

Item 14. The method according to any one of the preceding Items, wherein the method comprises:

receiving (3105), from the first network node, an indication that the first WD is to provide reference information.

Item 15. The method according to any one of the Items 1 to 14, wherein the first network node is a location network node.

Item 16. The method according to any one of the Items 1 to 14, wherein the first network node is the radio network node.

Item 17. A method, performed by a first network node, for determining a network node property, the method comprising:

receiving (S204), from a first wireless device, WD, an indication indicative of the first WD being capable of providing reference information, transmitting (S206), to the first WD, a request to provide the reference information for providing assistance to the first network node, obtaining (S208) the reference information for assisting the first network node in determining the network node property; and determining (3210) the network node property based on the reference information.

Item 18. The method according to Item 17, wherein the reference information for providing assistance is indicative of timing information of a signal transmission associated with a radio network node.

Item 19. The method according to Item 18, wherein the timing information comprises a timing error estimation of the signal transmission associated with the radio network node.

Item 20. The method according to any one of the Items 18 to 19, wherein the reference information is indicative of one or more of a propagation time of the signal transmission between the first WD and the radio network node, a timing error at a transmitter side in the first WD, a timing error at a receiver side in the first WD, a timing error at a transmitter side in the radio network node, and/or a timing error at a receiver side in the radio network node.

Item 21. The method according to any one of the Items 17 to 20, wherein the method comprises:

determining (S212) a position of one or more second WDs based on the network node property of the radio network node.

Item 22. The method according to any one of the Items 17 to 21, wherein the reference information comprises validation information indicative of a time duration for which the reference information is valid.

Item 23. The method according to any one of the Items 18 to 22, wherein the signal transmission is a positioning reference signal transmission.

Item 24. The method according to any one of the Items 18 to 23, wherein the network node property is a timing error at the radio network node.

Item 25. The method according to Item 24, wherein the timing error is a timing error at a transmitter and/or receiver at the radio network node.

Item 26. The method according to any one of the Items 17 to 25, wherein the reference information for providing assistance comprises reference information for providing assistance for positioning of one or more second WDs.

Item 27. The method according to any one of the Items 17 to 26, wherein the method comprises:

transmitting (S201), to the first WD, a configuration comprising one or more conditions that are to be satisfied for providing reference information.

Item 28. The method according to any one of the Items 17 to 27, wherein the one or more conditions comprise a threshold related to the first WD.

Item 29. The method according to any one of the Items 17 to 28, wherein the method comprises:

transmitting (S205), to the first WD, an indication that the first WD is to provide reference information.

Item 30. The method according to any one of the Items 17 to 29, wherein the first network node is a location network node.

Item 31. The method according to any one of the Items 17 to 29, wherein the first network node is the radio network node.

Item 32. The method according to Item 30 or 31, wherein obtaining (S208) reference information comprises receiving (S208A) reference information from the first WD.

Item 33. The method according to Item 30 or 32 when dependent on Item 30, wherein obtaining (S208) reference information comprises receiving (S208B) reference information from the radio network node.

Item 34. A first wireless device comprising memory circuitry, processor circuitry, and a wireless interface, wherein the first wireless device is configured to perform any of the methods according to any of Items 1-16.

Item 35. A first network node comprising memory circuitry, processor circuitry, and a wireless interface, wherein the first network node is configured to perform any of the methods according to any of Items 17-33.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-10 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a first wireless device (WD) for assisting a first network node in determining a network node property, the method comprising:

determining whether the first WD satisfies one or more conditions for providing reference information;

upon determining that the first WD satisfies the condition for providing the reference information, transmitting, to the first network node, an indication indicative of the first WD being capable of acting as a reference device to be used for positioning of one or more second WDs;

receiving, from the first network node, an indication of:

the first WD being enabled or activated as being a reference wireless device, or the first WD being disabled or deactivated as being a reference wireless device;

after receiving the indication of WD being enabled or activated as being a reference wireless device:

receiving a request to provide reference information assisting the first network node in determining a network property; and providing, to the first network node, the reference information for assisting the first network node in determining a network node property.

2. The method according to claim 1, wherein the reference information is indicative of timing information of a signal transmission associated with a radio network node.

3. The method according to claim 2, wherein the timing information comprises a timing error estimation of the signal transmission associated with the radio network node.

4. The method according to claim 2, wherein the reference information is indicative of one or more of: a propagation time of the signal transmission between the first WD and the radio network node, a timing error at a transmitter side in the first WD, a timing error at a receiver side in the first WD, a timing error at a transmitter side in the radio network node, and a timing error at a receiver side in the radio network node.

5. The method according to claim 2, wherein the reference information comprises validation information indicative of a time duration for which the reference information is valid.

6. The method according to claim 2, wherein the signal transmission is a positioning reference signal transmission.

7. The method according to claim 1, wherein the network node property of the radio network node is a timing error at the radio network node.

8. The method according to claim 7, wherein the timing error is a timing error at a transmitter and/or receiver at the radio network node.

9. The method according to claim 1, wherein the method comprises:

receiving, from the first network node, a configuration comprising the one or more conditions.

10. The method according to claim 1, wherein the one or more conditions comprise a threshold related to the first WD.

11. The method according to claim 10, wherein determining comprises:

determining whether the positioning uncertainty of the first WD is below the threshold.

12. The method according to claim 1, wherein the method comprises:

performing measurements for determining the reference information.

13. The method according to claim 1, wherein the method comprises:

receiving, from the first network node, an indication that the first WD is to provide reference information.

14. The method according to claim 1, wherein the first network node is a location network node.

15. The method according to claim 1, wherein the first network node is the radio network node.

16. A method, performed by a first network node, for determining a network node property, the method comprising:

receiving, from a first wireless device (WD) an indication indicative of the first WD being capable of acting as a reference device to be used for positioning of one or more second WDs;

transmitting, to the first WD, an indication of the first WD being enabled or activated as being a reference wireless device and a request to provide the reference information for providing assistance to the first network node;

obtaining the reference information for assisting the first network node in determining the network node property; and determining the network node property based on the reference information.

17. The method according to claim 16, wherein the reference information for providing assistance is indicative of timing information of a signal transmission associated with a radio network node.

18. The method according to claim 17, wherein the timing information comprises a timing error estimation of the signal transmission associated with the radio network node.

19. The method according to claim 17, wherein the reference information is indicative of one or more of a propagation time of the signal transmission between the first WD and the radio network node, a timing error at a transmitter side in the first WD, a timing error at a receiver side in the first WD, a timing error at a transmitter side in the radio network node, and/or a timing error at a receiver side in the radio network node.

* * * * *